United States Patent
Hsu et al.

(10) Patent No.: US 8,151,241 B2
(45) Date of Patent: Apr. 3, 2012

(54) IMPEDANCE DESIGN METHOD

(75) Inventors: Hsing-Chou Hsu, Tainan County (TW);
Tung-Yang Chen, Tainan County (TW);
Sheng-Fan Yang, Tainan County (TW)

(73) Assignee: Himax Technologies Limited, Sinshih Township, Tainan County (TW)

(*) Notice: Subject to any disclaimer, the term of this patent is extended or adjusted under 35 U.S.C. 154(b) by 215 days.

(21) Appl. No.: 12/693,473

(22) Filed: Jan. 26, 2010

(65) Prior Publication Data
US 2011/0185336 A1 Jul. 28, 2011

(51) Int. Cl.
*G06F 11/22* (2006.01)
*G06F 17/50* (2006.01)
(52) U.S. Cl. ........................ 716/136; 716/137
(58) Field of Classification Search .................. 716/136, 716/137
See application file for complete search history.

(56) References Cited

U.S. PATENT DOCUMENTS 7,269,521 B2 * 9/2007 Hsu et al. ..................... 702/57
2008/0270964 A1 * 10/2008 Kobayashi et al. ............ 716/8
* cited by examiner

*Primary Examiner* — Suresh Memula
(74) *Attorney, Agent, or Firm* — Thomas|Kayden

(57) ABSTRACT

The invention discloses an impedance design method for a power network of a core chip within a chipset having N input/output (I/O) ports coupled to a voltage source which have an observation I/O port. The method includes calculating a first set of impedances at a predetermined frequency or the observation I/O port, if the voltage source is internally coupled to the N I/O ports within the chipset, and calculating a second set of impedances at the predetermined frequency for the observation I/O port, if the voltage source is externally coupled to the N I/O ports through a carrier coupling the core chip to the voltage source. The first set of impedances to the second set of impedances are compared, and the impedance of the power network or the impedance of the carrier is adjusted according to the comparison result.

4 Claims, 10 Drawing Sheets

IMPEDANCE DESIGN METHOD

BACKGROUND OF THE INVENTION

1. Field of the Invention

The invention relates generally to an impedance design method, and more particularly, to an impedance design method for a power network of a chipset.

2. Description of the Related Art

FIG. 1 depicts a diagram of a power network. The power network has N input/output (I/O) ports connected to a power supply Vcc. Ideally, the voltages $V_1$ to $V_N$ should all be equal to the power supply Vcc and should never change. In practice, however, a voltage of any I/O port may vary slightly as the current of other I/O ports changes. Take the I/O port 1 as an example, the variation of the current for any other I/O ports 2 through N may result in a slight voltage variation on the I/O port 1.

The problem is caused by the impedances between I/O ports.

BRIEF SUMMARY OF THE INVENTION

In light of the previously described problems, there exists a need for an impedance design method for a power network.

An embodiment of the invention discloses an impedance design method for a power network of a core chip of a chipset, wherein the power network has N input/output (I/O) ports coupled to a voltage source, and the N I/O ports comprise an observation I/O port. The method comprises calculating a first set of impedances for the observation I/O port at a predetermined frequency, if the voltage source is internally coupled to the N I/O ports within the chipset, wherein the first set of impedances comprises a self-impedance of the observation I/O port and mutual impedances of the observation I/O port with respect to other I/O ports. The method further comprises calculating a second set of impedances at the predetermined frequency for the observation I/O port, if the voltage source is externally coupled to the N I/O ports through a carrier coupling the core chip to the voltage source, wherein the second set of impedances comprises a self-impedance of the observation I/O port and mutual impedances of the observation I/O port with respect to other I/O ports. The method further comprises comparing the first set of impedances to the second set of impedances, wherein the impedance of the power network or the carrier is adjusted according to the comparison result.

Another embodiment of the invention discloses an impedance design method for a power network of a core chip of a chipset, wherein the power network has N input/output (I/O) ports coupled to a voltage source, and the N I/O ports comprise an observation I/O port. The method comprises calculating a first set of impedances at a predetermined frequency for the observation I/O port, if the voltage source is externally coupled to the N I/O ports through a first carrier coupling the core chip to the voltage source, wherein the first set of impedances comprises a self-impedance of the observation I/O port and mutual impedances of the observation I/O port with respect to other I/O ports. The method further comprises calculating a second set of impedances at the predetermined frequency for the observation I/O port, if the voltage source is externally coupled to the N I/O ports through a second carrier coupling the core chip to the voltage source, wherein the second carrier is different from the first carrier and the second set of impedances comprises a self-impedance of the observation I/O port and mutual impedances of the observation I/O port with respect to other I/O ports. The method further comprises comparing the first set of impedances to the second set of impedances, wherein the impedance of the first or the second carrier is adjusted according to the comparison result.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
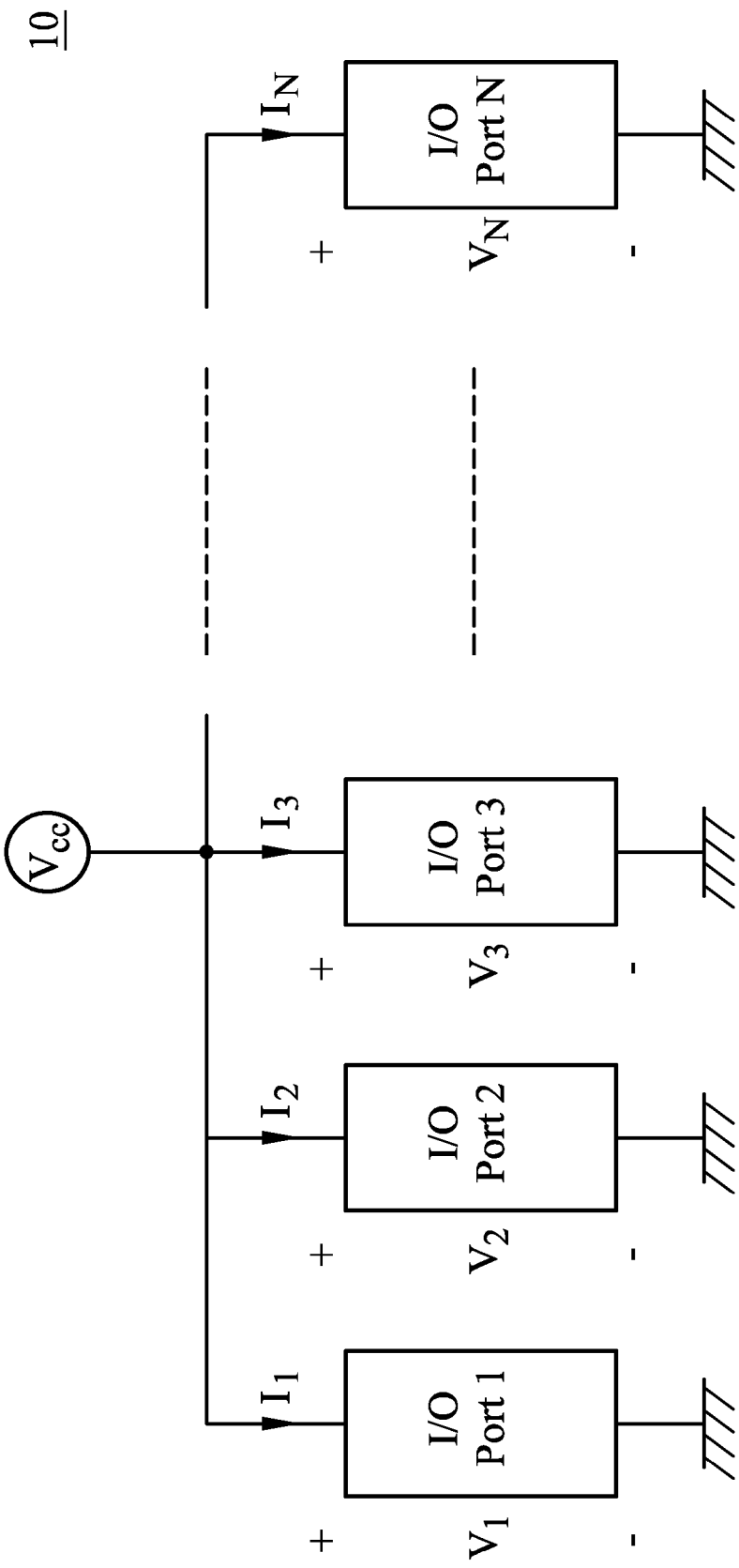
FIG. 1 depicts a diagram of a power network.
Figure 2:
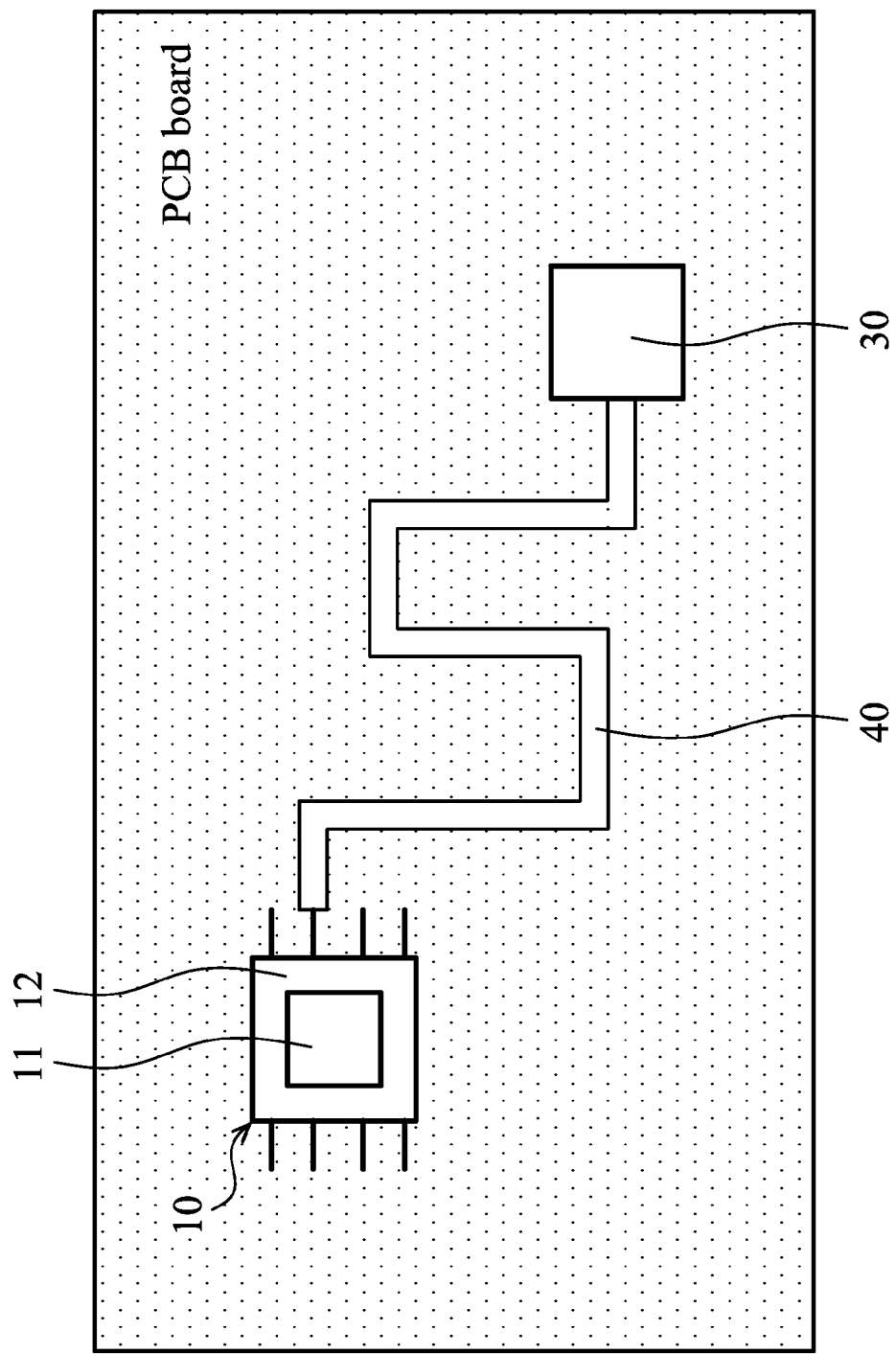
FIG. 2 depicts a diagram of a chipset that is mounted on a PCB.
Figure 3:
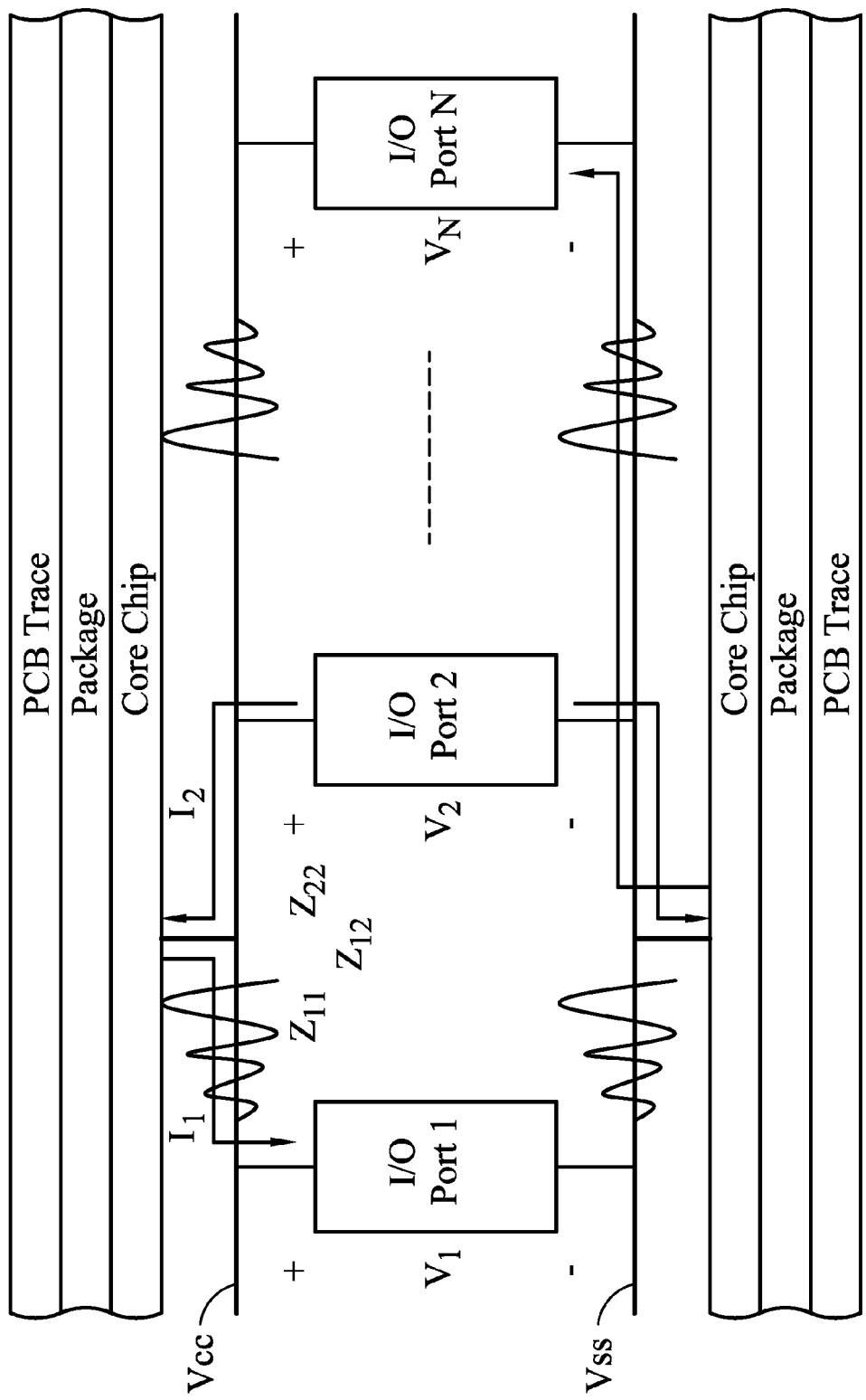
FIG. 3 depicts a hierarchical structure of a core chip, a package and a PCB trace.

FIG. 2 depicts a diagram of a chipset that is mounted on a printed circuit board (PCB). The chipset 10 consists of a core chip 11 and a package 12. The core chip 11 is the portion of the chipset 10 that simply comprises electronic circuitries therein, whereas the package 12 is the portion of the chipset 10 that serves as the package of the core chip 11. A voltage regulator 30 may provide power voltage to the chipset 10 via a PCB trace 40. FIG. 3 depicts a hierarchical structure of the core chip 11, the package 12 and the PCB trace 40. In FIG. 3, the core chip 11 comprises a power network having N input/output (I/O) ports supplied by a power voltage Vcc. The power supply Vcc may be provided by two sources: (1) by an ideal voltage source embedded in the core chip 11 (called an "on-chip case" hereinafter), or (2) by the voltage regulator 30 via the PCB trace 40 (called a "system case" hereinafter). In the on-chip case where the power supply Vcc is provided by the ideal voltage source (not shown) embedded in the core chip 11, a voltage-current relationship for the power network may be expressed as:

$$\begin{bmatrix} V_{1\_ON} \\ V_{2\_ON} \\ \vdots \\ V_{N\_ON} \end{bmatrix} = \begin{bmatrix} Z_{11\_ON} & Z_{12\_ON} & \cdots & Z_{1N\_ON} \\ Z_{21\_ON} & Z_{22\_ON} & \cdots & Z_{2N\_ON} \\ \vdots & \vdots & & \vdots \\ Z_{N1\_ON} & Z_{N2\_ON} & \cdots & Z_{NN\_ON} \end{bmatrix} \begin{bmatrix} I_{1\_ON} \\ I_{2\_ON} \\ \vdots \\ I_{N\_ON} \end{bmatrix},$$

wherein, the voltage metric ($V_{1\_ON}$ through $V_{N\_ON}$) of the power network is the product of the impedance metric and the metric of current ($I_{1\_ON}$ through $I_{N\_ON}$). The symbol $V_{1\_ON}$ represents the voltage on the I/O port 1, the symbol $V_{2\_ON}$ represents the voltage on the I/O port 2 and so on. According to the above metric, the voltages $V_{1\_ON}$ to $V_{N\_ON}$ are listed as below:

$$V_{1\_ON} = Z_{11\_ON} * I_{1\_ON} + Z_{12\_ON} * I_{2\_ON} + \ldots + Z_{1N\_ON} * I_{N\_ON} \quad (A)$$

$$V_{2\_ON} = Z_{21\_ON} * I_{1\_ON} + Z_{22\_ON} * I_{2\_ON} + \ldots + Z_{2N\_ON} * I_{N\_ON}$$

$$\vdots$$

$$V_{N\_ON} = Z_{N1\_ON} * I_{1\_ON} + Z_{N2\_ON} * I_{2\_ON} + \ldots + Z_{NN\_ON} * I_{N\_ON}.$$

As stated above, ideally, the voltages $V_{1\_ON}$ to $V_{N\_ON}$ should be equal to the power supply Vcc. However, the above formula (A) shows that the voltage of an I/O port may be affected (or determined) by the current of the I/O port or of other I/O ports. For example, take the I/O port 1 as an observation I/O port, the voltage $V_{1\_ON}$ is affected by the current $I_{1\_ON}$ of the I/O port 1, as well as the currents $I_{2\_ON}$ through $I_{N\_ON}$ on other I/O ports. This relationship suggests that the variation of a current on an I/O port will cause the voltages of other I/O ports to vary, resulting in unstable voltages for other I/O ports.

The voltage variation on an observation I/O port results from self-impedance of the observation I/O port and mutual-impedances of the observation I/O ports with respect to other I/O ports. Take the I/O port 1 as an example, the voltage $V_{1\_ON}$ is affected by the current $I_{1\_ON}$ due to the impedance of the I/O port 1, called $Z_{11\_ON}$ (self-impedance). If the $Z_{11\_ON}$ can be reduced to zero, the voltage $V_{1\_ON}$ won't be affected by the current $I_{1\_ON}$. In addition, the voltage $V_{1\_ON}$ is also affected by the currents $I_{2\_ON}$ through $I_{N\_ON}$ due to the mutual-impedances of the I/O port 1 with respect to other I/O ports (namely, the mutual-impedances between the I/O port 1 and other I/O ports), called $Z_{12\_ON}$, $Z_{13\_ON}$ and so on. Wherein, the symbol $Z_{12\_ON}$ represents the mutual-impedance of the I/O port 1 with respect to the I/O port 2 (namely, the mutual-impedance between the I/O ports 1 and 2), $Z_{13\_ON}$ represents the mutual-impedance of the I/O port 1 with respect to the I/O port 3 (namely, the mutual-impedance between the I/O ports 1 and 3) and so on. If the $Z_{12\_ON}$ can be reduced to zero, the voltage $V_1$ won't be affected by the current $I_{2\_ON}$. Similarly, if the $Z_{13\_ON}$ can be reduced to zero, the voltage $V_{1\_ON}$ won't be affected by the current $I_{3\_ON}$ and so on. Therefore, to achieve a stable voltage $V_{1\_ON}$, the impedances $Z_{11\_ON}$, $Z_{12\_ON}$, ..., and $Z_{1N\_ON}$ should be reduced by as much as possible. In other words, the total impedance of $Z_{11\_ON}$ through $Z_{1N\_ON}$ should be as low as possible to obtain a stable voltage $V_{1\_ON}$. Ideally, the total impedance of $Z_{11\_ON}$ through $Z_{1N\_ON}$ is zero. Similarly, to achieve a stable voltage $V_{N\_ON}$ for an I/O port N, the impedances $Z_{N1\_ON}$, $Z_{N2\_ON}$, ..., and $Z_{NN\_ON}$ should be reduced by as much as possible. In other words, the total impedance of $Z_{N1\_ON}$ through $Z_{NN\_ON}$ should be as low as possible to obtain a stable voltage $V_{N\_ON}$. Ideally, the total impedance of $Z_{N1\_ON}$ through $Z_{NN\_ON}$ should be zero.

Note that in the on-chip case, since the power supply Vcc is provided to the core chip 11 by the ideal voltage source within the core chip 11, the impedance effect is mainly contributed by the metal routing of the core chip 11. That is, the impedances $Z_{11\_ON}$ through $Z_{NN\_ON}$ are mainly caused by the metal routing of the core chip 11. By properly designing the metal routing of the core chip 11, the total impedances of $Z_{11\_ON}$ through $Z_{1N\_ON}$ may be reduced (or adjusted).

Figure 4:
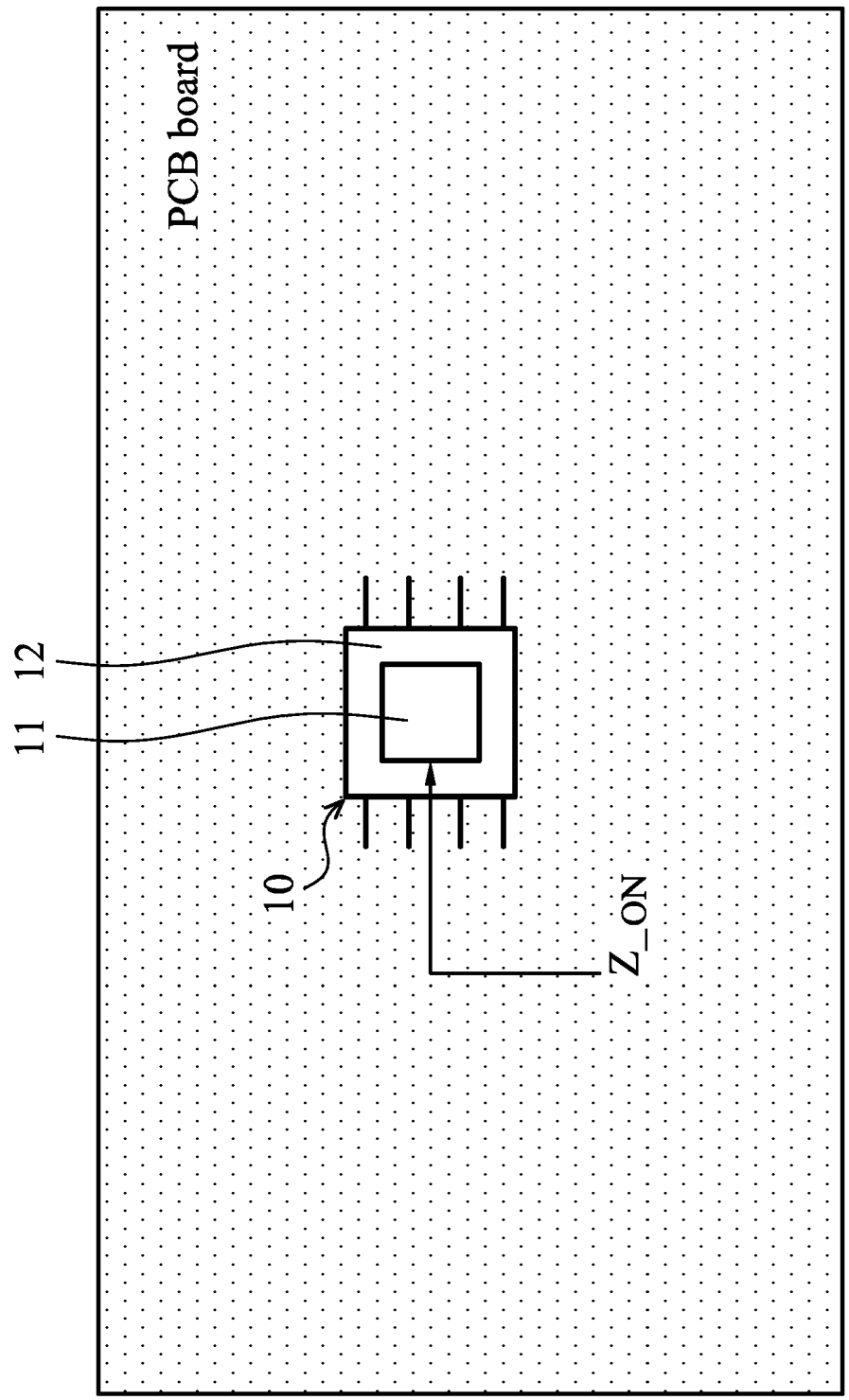
FIG. 4 depicts a diagram illustrating a location where an impedance metric of an on-chip case may be observed, according to an embodiment of the invention.

FIG. 4 depicts a diagram illustrating a location where an impedance metric of an on-chip case may be observed, according to an embodiment of the invention. In FIG. 4, it is shown that the impedance metric of the on-chip case may be observed at location $Z_{\_ON}$ of the core chip 11. The locations where an impedance metric of a system case may be observed will be explained later.

Figure 5A:
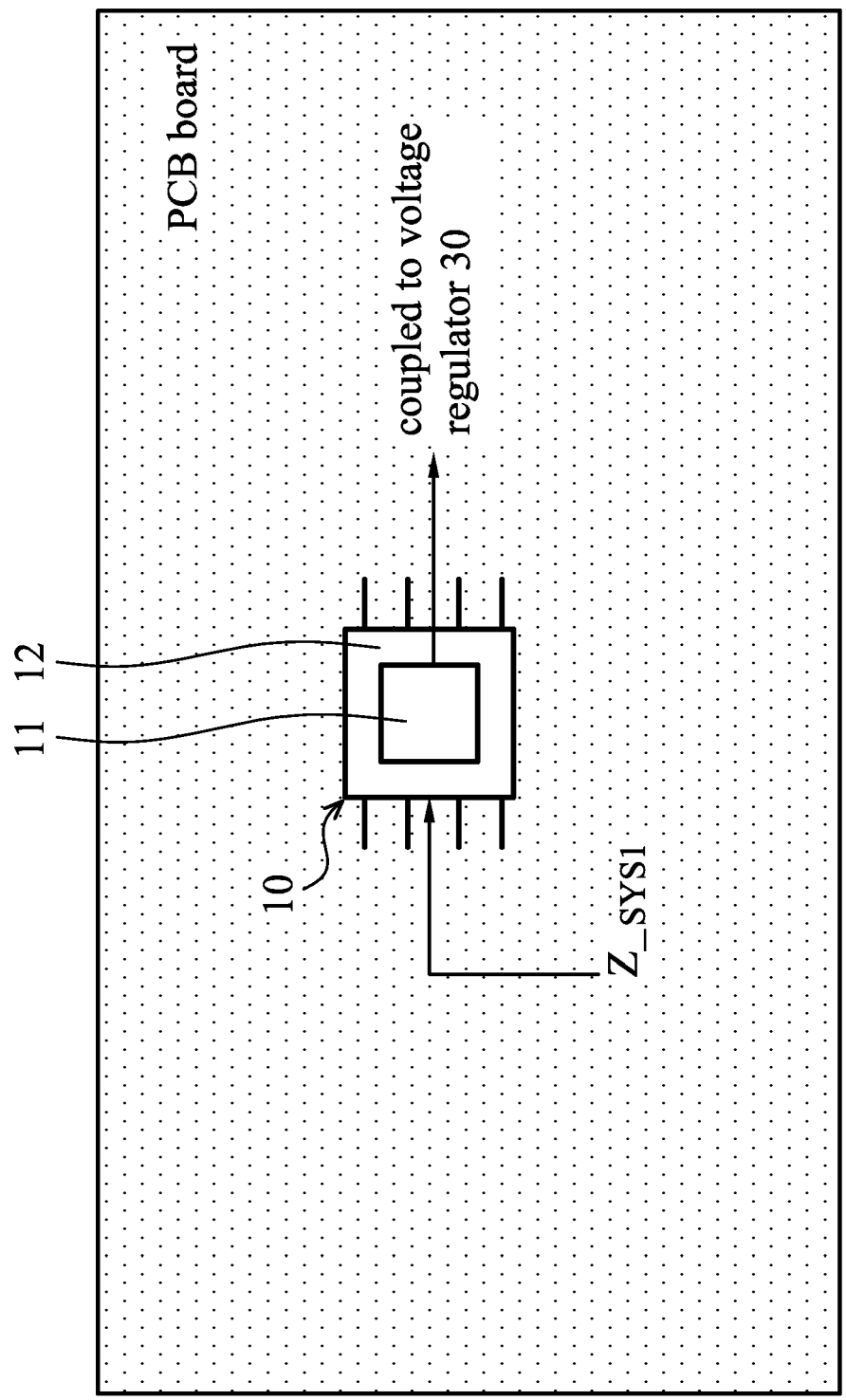
FIGS. 5(a) through 5(c) depict a diagram illustrating locations where an impedance metric of a system case may be observed, according to an embodiment of the invention.
Figure 5B:
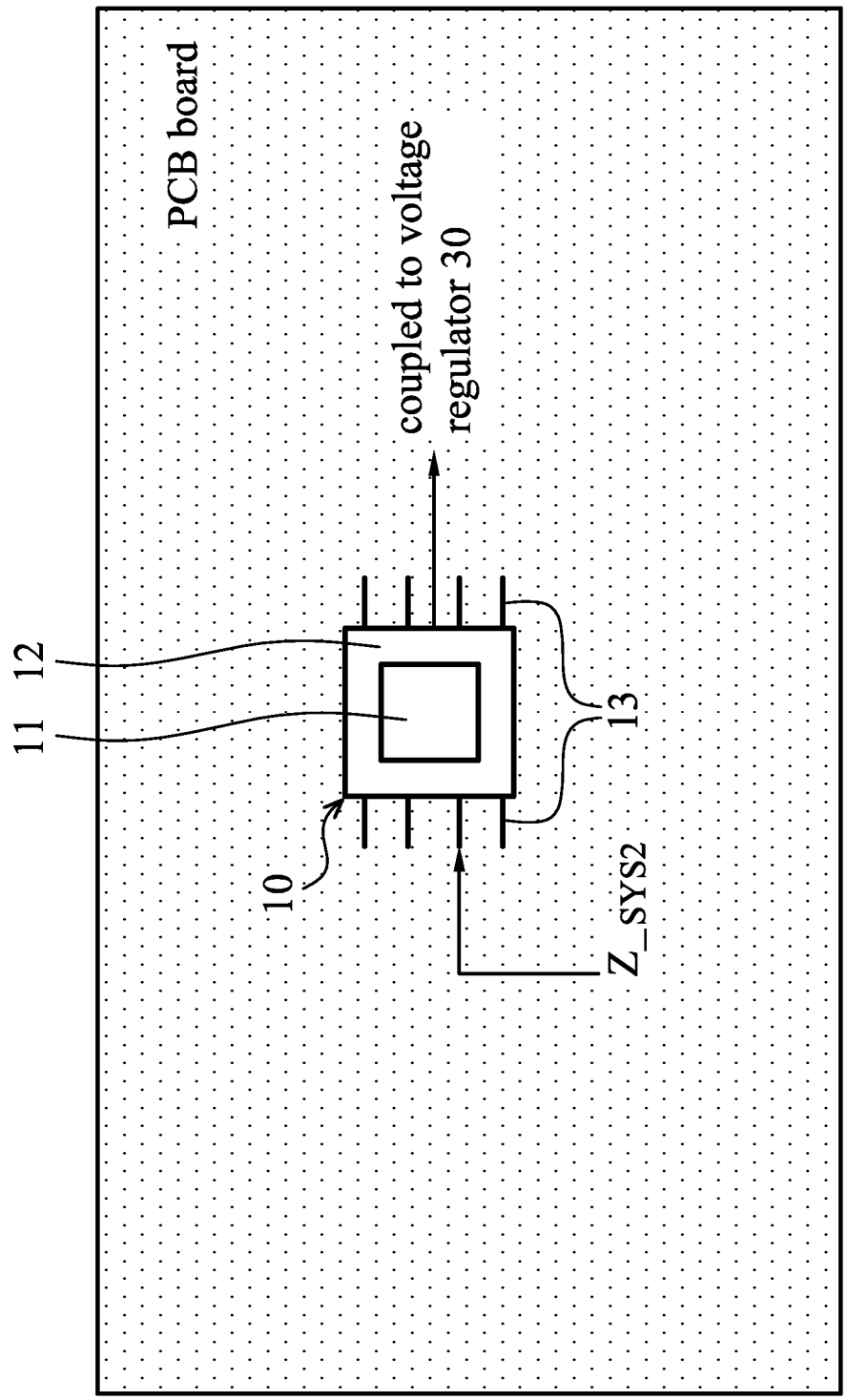
Figure 5C:
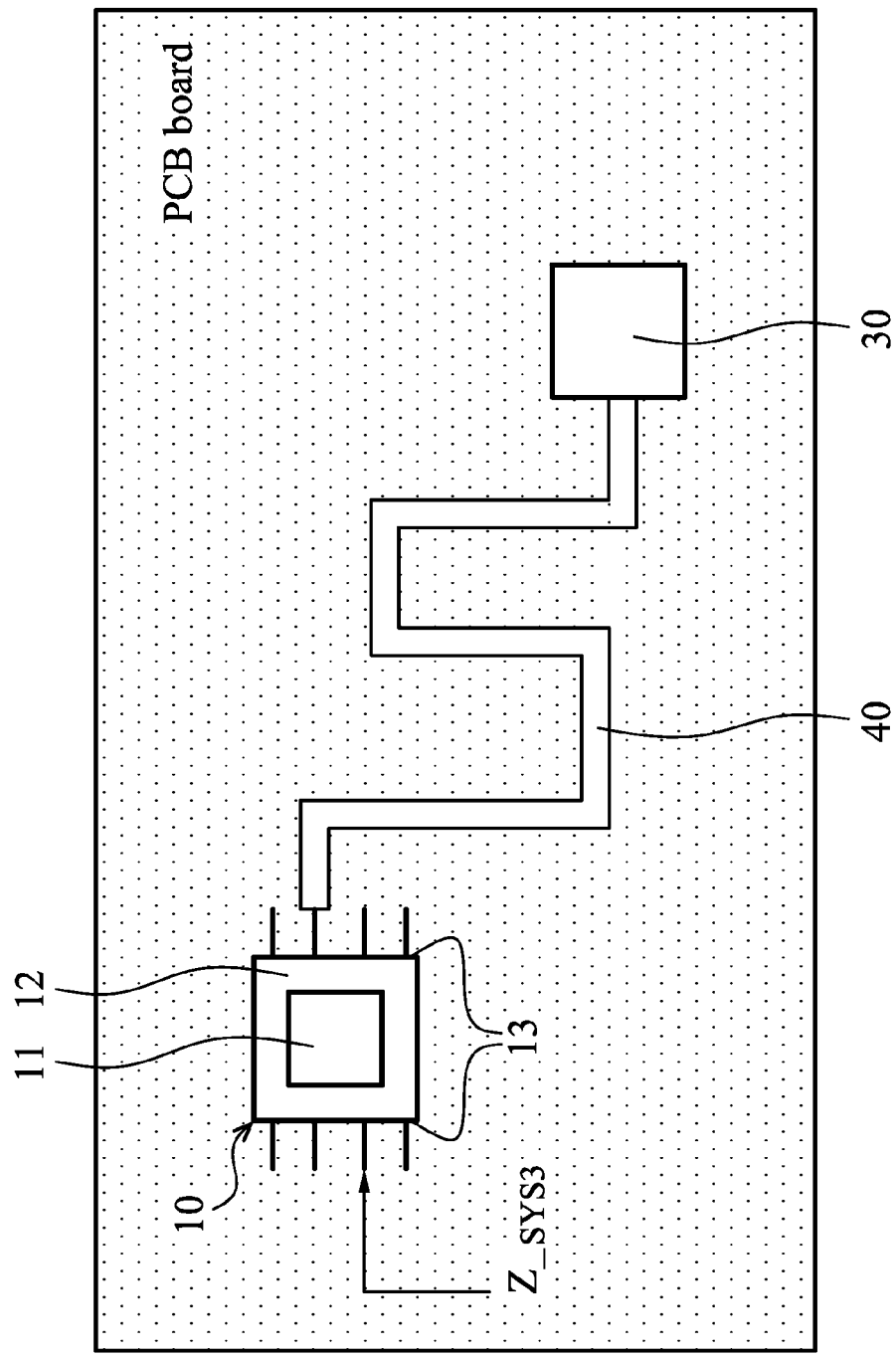

Following, a system case will be discussed. FIGS. 5(*a*) through 5(*c*) depict a diagram illustrating locations where an impedance metric of a system case may be observed, according to an embodiment of the invention. In FIG. 5(*a*), it is shown that the impedance metric of the system case may be observed at location $Z_{\_SYS1}$ of not only the core chip 11 but also the package 12. In this situation, the core chip 11 is coupled to the voltage regulator 30 via the package 12. The package 12 here may be regarded as a carrier that serves as a medium coupling the core chip 11 to the voltage regulator 30. In FIG. 5(*b*), it is shown that that chipset 10 comprises a core chip 11, a package 12 and a plurality of wirebonds 13. The wirebonds 13 may be the input/output (I/O) pins of the chipset 10. In this regard, the impedance metric of the system case may be observed at location $Z_{\_SYS2}$ of not only the core chip 11 and the package 12, but also the plurality of wirebonds 13. In this situation, the core chip 11 is coupled to the voltage regulator 30 via the package 12 and the plurality of wirebonds 13. The package 12 and the plurality of wirebonds 13 here may be regarded as a carrier that serves as a medium coupling the core chip 11 to the voltage regulator 30. In FIG. 5(*c*), it is shown that the impedance metric of the system case may be observed at location $Z_{\_SYS3}$ of not only the core chip 11, the package 12 and the plurality of wirebonds 13, but also the PCB trace 40. In this situation, the core chip 11 is coupled to the voltage regulator 30 via the package 12, the plurality of wirebonds 13 and the PCB trace 40. The package 12, the plurality of wirebonds 13 and the PCB trace 40 here may be regarded as a carrier that serves as a medium coupling the core chip 11 to the voltage regulator 30. In the system case where the voltage power supply Vcc is provided to the core chip 11 by the voltage regulator 30 via a carrier of the core chip 11, the impedance effect is not only contributed by the metal routing of the core chip 11, but also contributed by the carrier of the core chip 11. The carrier herein refers to as the medium that couples the core chip 11 to the voltage regulator 30, which may be the wirebond (not shown) or the package 12 of the chipset 10, or the PCB trace 40.

For the system case where the power supply Vcc is provided by the voltage regulator 30 via the carrier, the invention also provides a voltage-current relationship for the power network:

$$\begin{bmatrix} V_{1\_SYS} \\ V_{2\_SYS} \\ \vdots \\ V_{N\_SYS} \end{bmatrix} = \begin{bmatrix} Z_{11\_SYS} & Z_{12\_SYS} & \cdots & Z_{1N\_SYS} \\ Z_{21\_SYS} & Z_{22\_SYS} & \cdots & Z_{2N\_SYS} \\ \vdots & \vdots & & \vdots \\ Z_{N1\_SYS} & Z_{N2\_SYS} & \cdots & Z_{NN\_SYS} \end{bmatrix} \begin{bmatrix} I_{1\_SYS} \\ I_{2\_SYS} \\ \vdots \\ I_{N\_SYS} \end{bmatrix},$$

wherein, the voltage metric (voltages $V_{1\_SYS}$ through $V_{N\_SYS}$) of the power network is the product of the impedance metric and the metric of current ($I_{1\_SYS}$ through $I_{N\_SYS}$). The symbol $V_{1\_SYS}$ represents the voltage on the I/O port 1), the symbol $V_{2\_SYS}$ represents the voltage on the I/O port 2 and so on. According to the above metric, the voltages $V_{1\_SYS}$ to $V_{N\_SYS}$ are listed as below:

$$V_{1\_SYS} = Z_{11\_SYS} * I_{1\_SYS} + Z_{12\_SYS} * I_{2\_SYS} + \ldots + Z_{1N\_SYS} * I_{N\_SYS} \quad \text{(B)}$$
$$V_{2\_SYS} = Z_{21\_SYS} * I_{1\_SYS} + Z_{22\_SYS} * I_{2\_SYS} + \ldots + Z_{2N\_SYS} * I_{N\_SYS}$$
$$\vdots$$
$$V_{N\_SYS} = Z_{N1\_SYS} * I_{1\_SYS} + Z_{N2\_SYS} * I_{2\_SYS} + \ldots + Z_{NN\_SYS} * I_{N\_SYS}.$$

Figure 6:
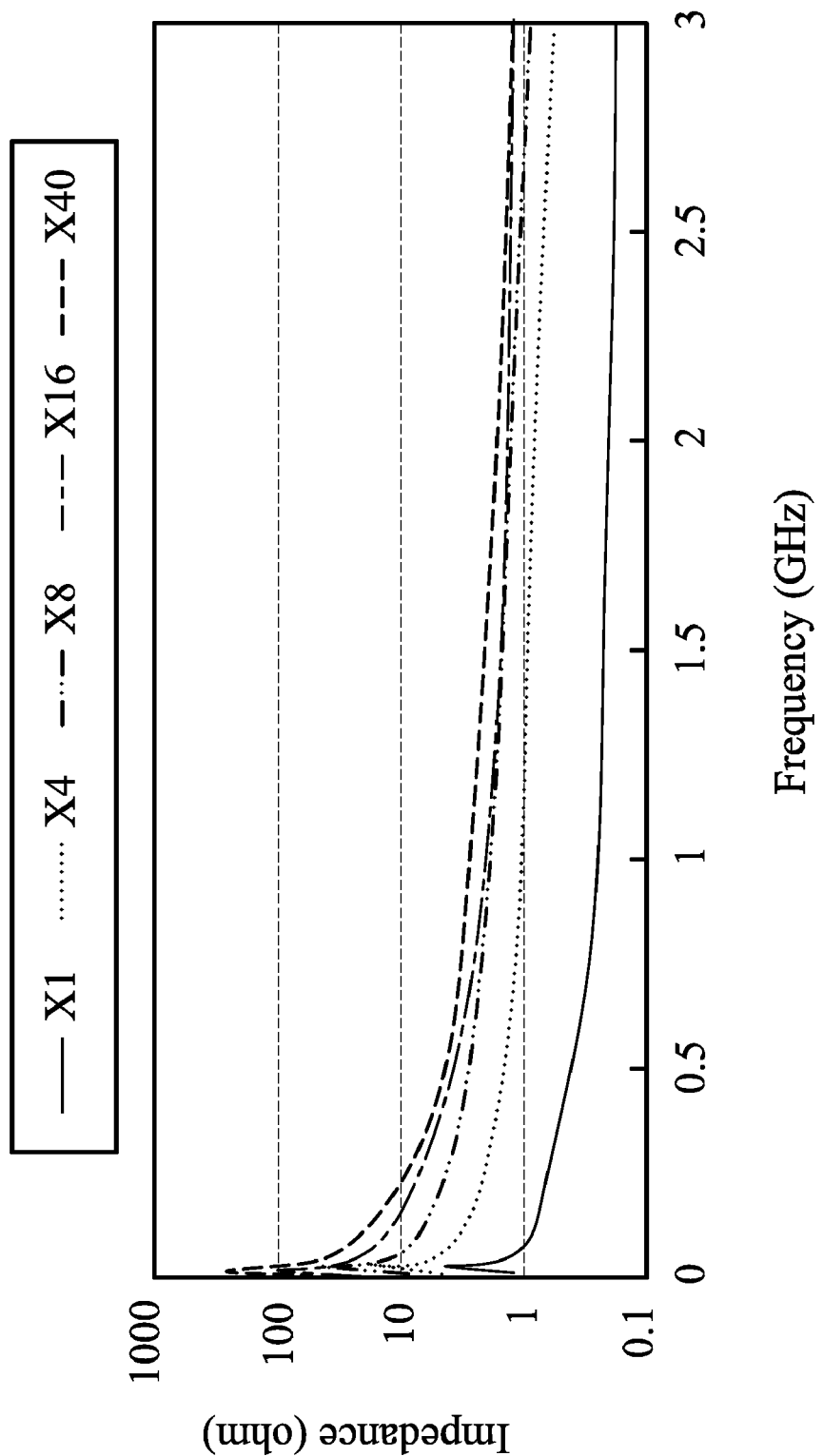
FIG. 6 depicts a diagram illustrating a relationship between total impedance and the number of I/O ports.
Figure 7:
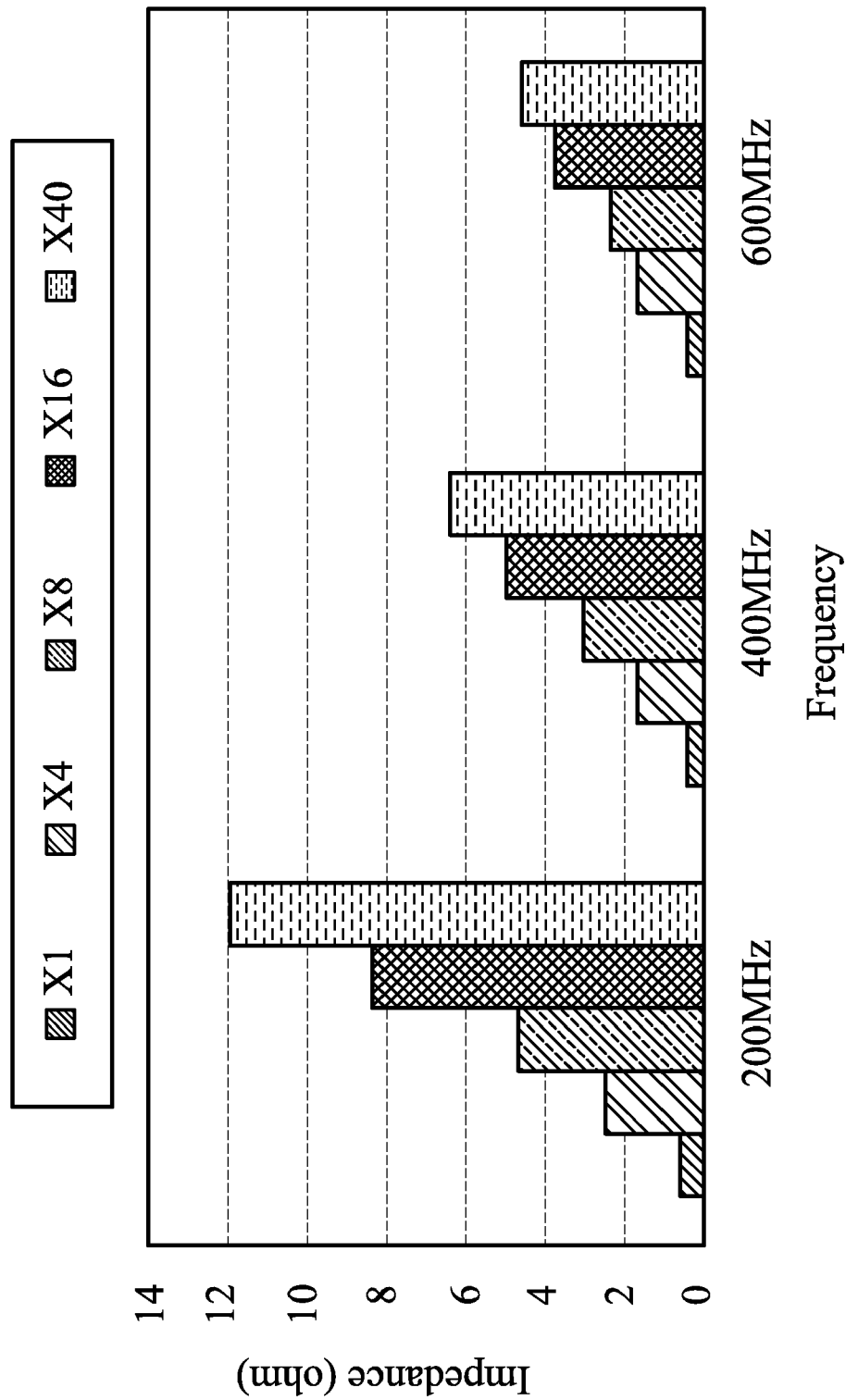
FIG. 7 depicts a diagram illustrating the value of total impedance for different number of I/O ports, with three observation frequencies: 200 MHz, 400 MHz and 600 MHz.

In the system case, in addition to the metal routing of the core chip 11, the carrier of the core chip 11 also affects the value of impedances $Z_{11\_SYS}$ through $Z_{NN\_SYS}$. By properly designing the metal routing and the carrier of the core chip 11 (i.e. properly designing the wirebond or the package 12 of the chipset 10, or the PCB trace 40), the total impedances of $Z_{11\_SYS}$ through $Z_{1N\_SYS}$ may be reduced (or adjusted). Here, the invention compares the impedance metric of the on-chip case (power supply Vcc being provided by an ideal voltage source within the core chip 11) with that of the system case (power supply Vcc being provided by the voltage regulator 30 via the carrier), at a predetermined frequency of 200 MHz, as shown in FIG. 5. FIG. 6 depicts a diagram illustrating a relationship between total impedance (not necessarily the previously described total impedances of $Z_{11\_SYS}$ through $Z_{1N\_SYS}$) and the number of I/O port for a system case. In FIG. 6, N (i.e. the number of I/O ports) is assumed to be 1, 4, 8, 16 and 40, respectively. Here, observation frequency is assumed to be 200 MHz. When N is 1, the total impedance is a minimum value, and when N is 40, total impedance is a maximum value. Thus, the more the I/O ports are, the larger the total impedance is. FIG. 7 depicts a diagram illustrating the value of total impedance for different number of I/O ports, with three observation frequencies: 200 MHz, 400 MHz and 600 MHz. Based on the profile of FIG. 7, it is shown that the lower the observation frequency is, the higher the total impedance is.

Figure 8:
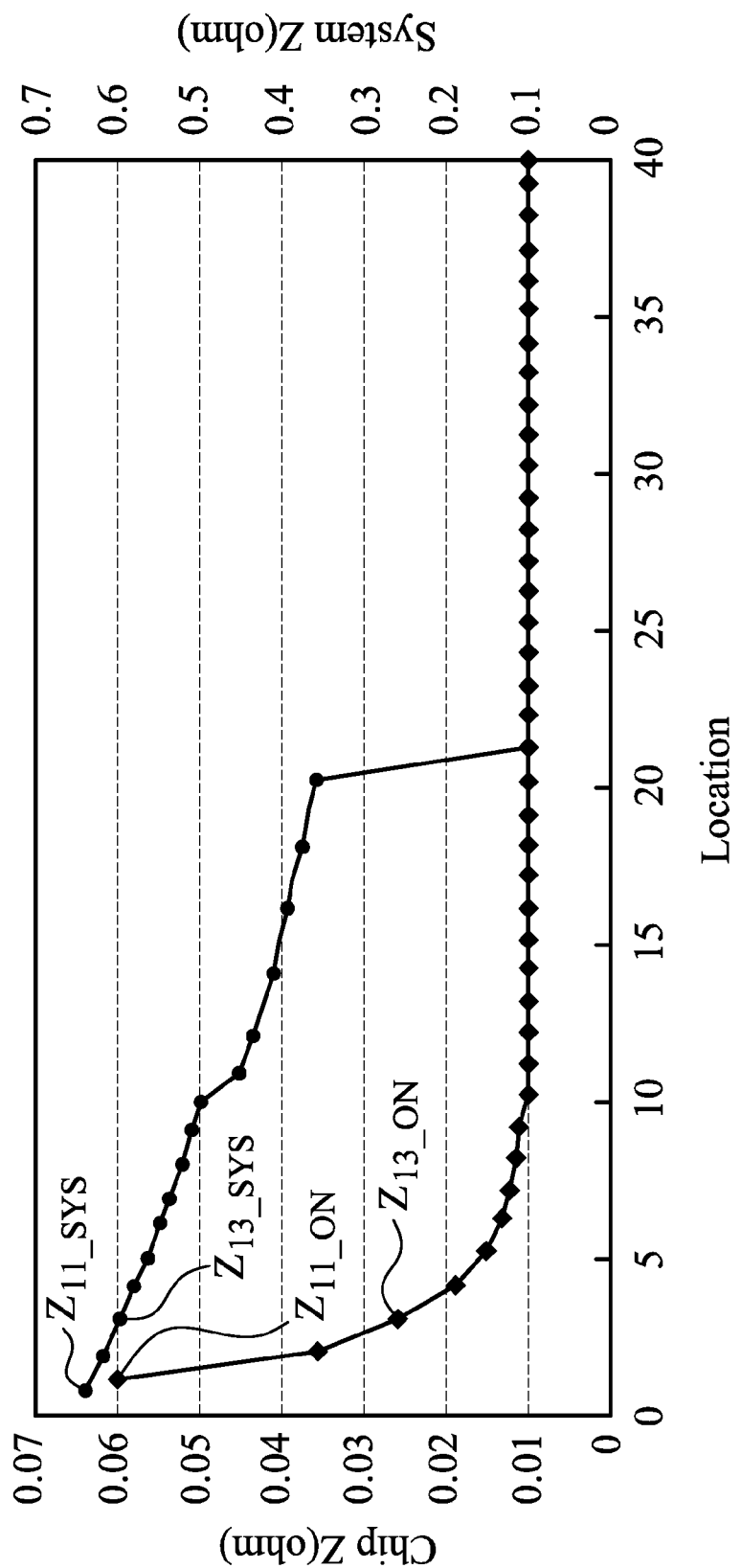
FIG. 8 depicts a diagram illustrating comparison of impedance metrics between an on-chip case and a system case at a predetermined frequency of 200 MHz.

In FIG. 8, it is shown that the impedances $Z_{11\_ON}$ through $Z_{1N\_ON}$ for the on-chip case are smaller than impedances $Z_{11\_SYS}$ through $Z_{1N\_SYS}$ of the system case. In addition, in the on-chip case, the mutual-impedance $Z_{13\_ON}$ is substantially half the value of the self-impedance $Z_{11\_ON}$, whereas in the system case the mutual-impedance $Z_{13\_SYS}$ is merely slightly lower than the value of the self-impedance $Z_{11\_SYS}$. This suggests that the impedance characteristic of the on-chip case is better than the system case. Based on the comparison, the carrier of the core chip 11 should be re-designed in order to reduce the impedance effect caused by the carrier. In other words, the package 12 of the chipset 10 should be re-designed in order to adjust the impedance characteristics of the package 12 to obtain a lower impedance for the package 12, or the PCB trace 40 should be re-designed in order to adjust the impedance characteristics of the PCB trace 40 to obtain a lower impedance for the PCB trace 40. In either case, if the impedance characteristic of the on-chip case is not good, the metal routing of the core chip 11 should be re-designed to lower impedance thereof. With the proposed impedance design method, layout engineers can easily determine which part of a system (such as the metal routing of the core chip 11, the wirebond or the package 12 of the chipset 10, or the PCB trace 40) has a large impedance metric value. Once a part is determined, the related portion will be re-designed to improve the impedance characteristics thereof, thereby providing better voltage stability for the power network.

Although the above embodiment compares the impedances metrics of the on-chip case and the system case, however, in another embodiment, the impedance metrics of two system cases may also be compared. For example, in a first case, the voltage regulator 30 is externally coupled to the N I/O ports of a power network of the core chip 11 through a first carrier. In a second case, the voltage regulator 30 is externally coupled to the N I/O ports of the power network of the core chip 11 through a second carrier. The first carrier may be the package 12 of the chipset 10 and the second carrier may be the wirebond of the chipset 10, or the first carrier may be the PCB trace 40 and the second carrier may be the package 12 or the wirebond of the chipset 10.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An impedance design method for a power network of a core chip within a chipset having N input/output (I/O) ports coupled to a voltage source which have an observation I/O port, comprising:
    calculating a first set of impedances at a predetermined frequency for the observation I/O port, if the voltage source is internally coupled to the N I/O ports within the chipset, wherein the first set of impedances comprises a self-impedance of the observation I/O port and mutual impedances of the observation I/O port with respect to other I/O ports;
    calculating a second set of impedances at the predetermined frequency for the observation I/O port, if the voltage source is externally coupled to the N I/O ports through a carrier coupling the core chip to the voltage source, wherein the second set of impedances comprises a self-impedance of the observation I/O port and mutual impedances of the observation I/O port with respect to other I/O ports;
    comparing the first set of impedances to the second set of impedances; and
    adjusting the impedance of the power network or the impedance of the carrier according to the comparison result.

2. The impedance design method as claimed in claim 1, wherein the carrier comprises the package of the chipset.

3. The impedance design method as claimed in claim 1, wherein the carrier comprises the wirebond of the chipset.

4. The impedance design method as claimed in claim 1, wherein the carrier comprises a PCB trace coupling the voltage source to the chipset.

* * * * *